United States Patent
Wilson et al.

(10) Patent No.: US 7,840,285 B2
(45) Date of Patent: Nov. 23, 2010

(54) SEQUENCE OF EVENTS RECORDER FACILITY FOR AN INDUSTRIAL PROCESS CONTROL ENVIRONMENT

(75) Inventors: Irvine William Wilson, Meerbusch (DE); Erna Renate Heinzelmann, Stuttgart (DE)

(73) Assignee: Invensys Systems, Inc., Foxboro, MA (US)

( * ) Notice: Subject to any disclaimer, the term of this patent is extended or adjusted under 35 U.S.C. 154(b) by 773 days.

(21) Appl. No.: 11/261,871

(22) Filed: Oct. 28, 2005

(65) Prior Publication Data

US 2007/0244571 A1 Oct. 18, 2007

(51) Int. Cl.
*G05B 15/00* (2006.01)
*G05B 11/01* (2006.01)
*G06F 15/173* (2006.01)

(52) U.S. Cl. .................. 700/11; 700/1; 700/12; 700/14; 700/16; 709/223; 709/224; 709/225

(58) Field of Classification Search .......... 700/1, 700/11, 12, 14, 15, 16; 709/223–225
See application file for complete search history.

(56) References Cited

U.S. PATENT DOCUMENTS

| | | | | |
|---|---|---|---|---|
| 4,550,382 A | * | 10/1985 | Federico et al. | 399/75 |
| 4,868,734 A | * | 9/1989 | Idleman et al. | 710/29 |
| 4,910,691 A | * | 3/1990 | Skeirik | 706/45 |
| 5,163,151 A | * | 11/1992 | Bronikowski et al. | 714/57 |
| 5,491,792 A | * | 2/1996 | Grisham et al. | 714/39 |
| 6,002,364 A | * | 12/1999 | Kroeger et al. | 342/359 |
| 6,404,743 B1 | * | 6/2002 | Meandzija | 370/254 |
| 6,421,571 B1 | * | 7/2002 | Spriggs et al. | 700/17 |
| 6,529,882 B1 | * | 3/2003 | Park et al. | 705/51 |
| 7,325,049 B2 | * | 1/2008 | Hatalkar | 709/223 |
| 2002/0124068 A1 | * | 9/2002 | Hatalkar | 709/223 |
| 2006/0059270 A1 | * | 3/2006 | Pleasant et al. | 709/237 |

* cited by examiner

*Primary Examiner*—Albert DeCady
*Assistant Examiner*—Sunray R Chang
(74) *Attorney, Agent, or Firm*—Leydig, Voit & Mayer, Ltd.

(57) ABSTRACT

A sequence of events (SOE) recorder facility in a process control network environment is described herein. The SOE recorder facility is hosted by a networked node that receives digital signal status change (event) data from a networked controller. The sequence of events recorder facility receives a configured set of digital data signals from the controller, temporarily buffers the events in chronological order according to timestamps assigned to the events by their sources (e.g., fieldbus modules). The data is thereafter copied/removed from the buffer and provided to multiple destinations including: a process database that maintains an archival copy of the received event data for rendering event reports, and an SOE client user interface for rendering event logs to printers and/or graphical user interface displays.

30 Claims, 4 Drawing Sheets

SEQUENCE OF EVENTS RECORDER FACILITY FOR AN INDUSTRIAL PROCESS CONTROL ENVIRONMENT

FIELD OF THE INVENTION

The present invention generally relates to the field of networked computerized control systems. More particularly, the invention concerns high speed data collection/processing systems for accumulating and analyzing real-time data rendered by control system components so that state changes (events), involving tracked control system parameter values, can be recorded and arranged in the order in which they occur for subsequent analysis.

BACKGROUND

Industry increasingly depends upon highly automated data acquisition and control systems to ensure that industrial processes are run efficiently, safely and reliably while lowering their overall production costs. Data acquisition begins when a number of sensors measure aspects of an industrial process and periodically report their measurements back to a data collection and control system. Such measurements come in a wide variety of forms. By way of example the measurements produced by a sensor/recorder include: a temperature, a pressure, a pH, a mass/volume flow of material, a tallied inventory of packages waiting in a shipping line, or a photograph of a room in a factory. Often sophisticated process management and control software examines the incoming data, produces status reports, and, in many cases, responds by sending commands to actuators/controllers that adjust the operation of at least a portion of the industrial process. The data produced by the sensors also allow an operator to perform a number of supervisory tasks including: tailor the process control (e.g., specify new set points) in response to varying external conditions (including costs of raw materials), detect an inefficient/non-optimal operating condition and/or impending equipment failure, and take remedial actions such as move equipment into and out of service as required.

Typical industrial processes are extremely complex and receive substantially greater volumes of information than any human could possibly digest in its raw form. By way of example, it is not unheard of to have thousands of sensors and control elements (e.g., valve actuators) monitoring/controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. When multiplied by thousands of sensors/control elements, so much data flows into the process control system that sophisticated data management and process visualization techniques are required.

Highly advanced human-machine interface/process visualization systems exist today that are linked to data sources such as the above-described sensors and controllers. Such systems acquire and digest (e.g., filter) the process data described above. The digested process data in-turn drives a graphical display rendered by a workstation's human machine interface. Such data includes mode changes, events, and alarm messages rendered by process controllers in response to a variety of detected process conditions/circumstances.

Process data is traditionally sent from plant controllers to operator displays on workstations and historical archives for trending and data collection purposes. Generally plant controllers have a block processing periods of 100 ms or more. This is acceptable for normal plant control purposes since most processes do not change greatly over such periods. However, when a process experiences a fault leading to, for example, a safety shutdown, the 100 ms period potentially prevents capture of digital state changes that would enable an operator to determine a source of a fault. Instead a number of faults will potentially have an identical time stamp—corresponding to the last block processing cycle. There is no way to discern from the time stamps the order in which a set of faults occurred. However, more recently control processors have been introduced that timestamp data wherein the granularity and degree of synchronization of assigned times are on the order of one ms. Such information can potentially be used by supervisory level systems to generate/provide a progression order of a sequence of faults in a system.

Many industries, including for example the power generation industries (both nuclear and non-nuclear), have a need to capture digital data at high speed (in very small time increments) for safety and/or environmental incident management reports. In the case of the nuclear power industry, such reports have been mandatory for over 30 years. If data is grouped in accordance with a block execution cycle, then a set of cascading process/equipment failures is likely to register as a set of simultaneous failures (the timestamp associated with a block cycle period within which the set of faults occurred). The ability to generate meaningful incident reports is potentially hampered by an inability to identify the actual temporal ordering of a set of related faults that occurred in a very short time period.

Another aspect of determining the cause(s) of a malfunction or shutdown is ensuring that sufficient process data points are tracked to enable a cause of a failure to be identified. Thus, devices are being used to track an increasing number of data points to provide greater granularity for process status views. The combination of more data points and greater timestamp granularity results in potentially much larger bursts of data from a system during failure or other exceptional circumstances. During a large-scale cascading set of failures in a process control system, a potentially very large volume of event data is rendered in a very short period time. As used herein, an "event" corresponds to a change in state of a digital input signal (e.g., on/off, open/closed, etc.). When a digital input goes from false to true (or true to false), an event is registered and an appropriate timestamped message is issued to appropriate subscribers to the event. A specialized facility, referred to as a sequence of events (SOE) database documents/records, with a higher degree of granularity, the order in which digital data, corresponding to particular events (e.g., disturbances, alarms, exceptions, etc.), is registered in a control system. Another challenge in complex distributed control systems is synchronizing the components that assign a timestamp to an event. Thus, it is desirable to provide a system for supporting the recording of a potentially very large number of events generated at a high frequency by distributed components in a process control environment with a high degree of granularity and a high degree of synchronicity.

SUMMARY OF THE INVENTION

In accordance with the present invention, a sequence of events management facility is described and claimed herein that is suitable for the operation in the above-described process control network environment. Such environment generally includes control modules that receive process status information, including event data, from input/output modules coupled to field devices. The sequence of events management facility in accordance with the present invention includes an event data interface for receiving timestamped event data originating from a digital field control process input and that is subsequently forwarded to the sequence of events management facility via a network communications link.

The sequence of events management facility furthermore includes a sequence of events server. The sequence of events server includes a process database providing access to an archival copy of the timestamped event data. The contents of the process database are accessed by submitting a logical query to the process database. The process database applies the query to a potentially large file comprising tabled event data. The time for providing a response is therefore potentially substantial.

The sequence of events server also includes an event buffer. The event buffer is interposed between the event data interface and the process database. The event buffer temporarily stores the event data received from the event data interface prior to storing the event data in the process database. Accessing the contents of the buffer is relatively fast, and in the illustrative embodiment response speeds are further improved by storing the event data in chronological order within the event buffer. Therefore, requests for a sequential log of received event data can be handled in an expedited manner by direct copying from the event buffer.

The sequence of events server also includes an event buffer. The event data client interface provides access to the timestamped event data received by the sequence of events management facility.

The invention is also directed to a method performed by the above-described sequence of events management facility as well as computer-readable media including computer-executable instructions that facilitate carrying out the recited steps of the inventive method.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
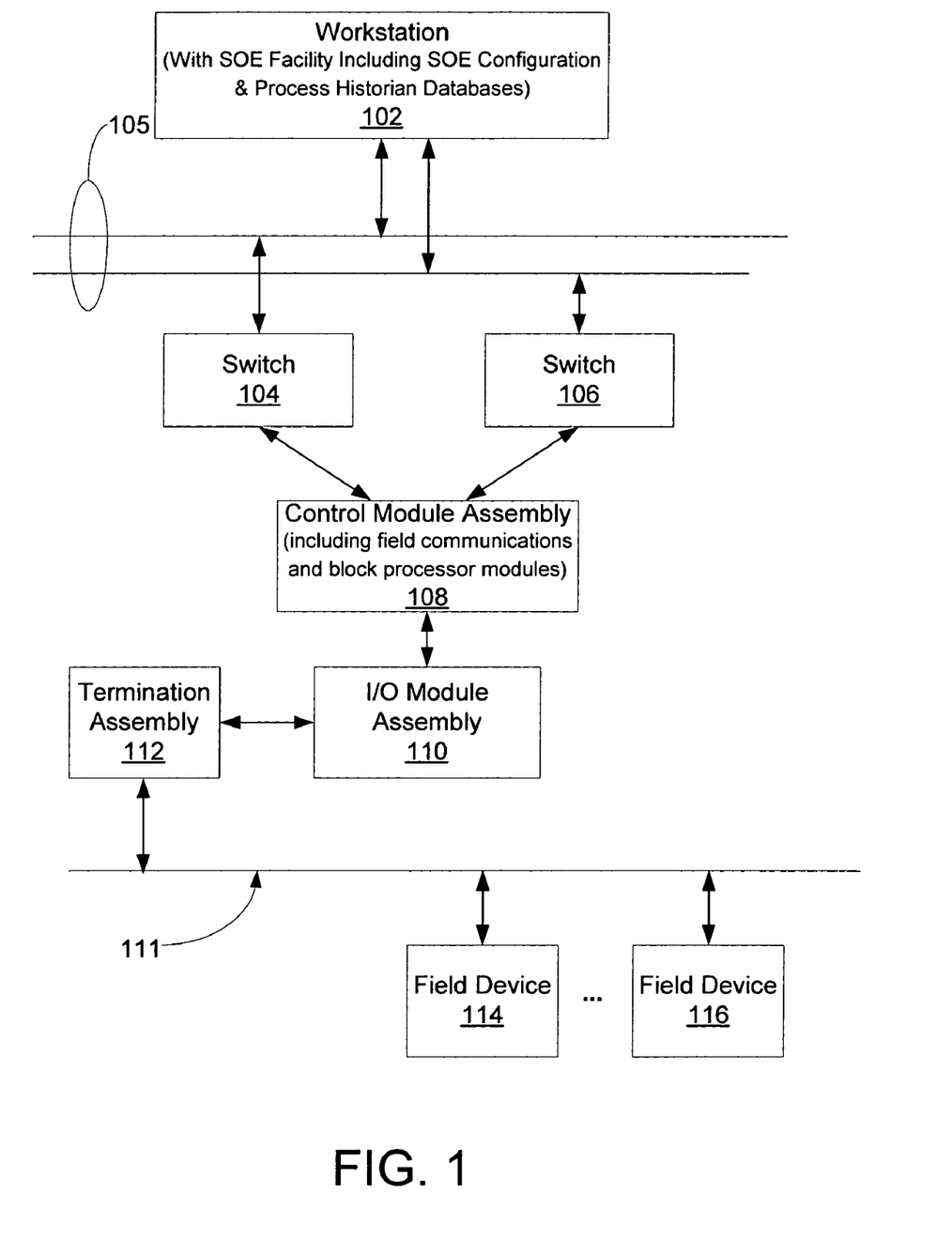
FIG. 1 is schematic network diagram showing an exemplary control environment comprising both a control network and an application/supervisory network suitable for carrying out an embodiment of the present invention.
Figure 2:
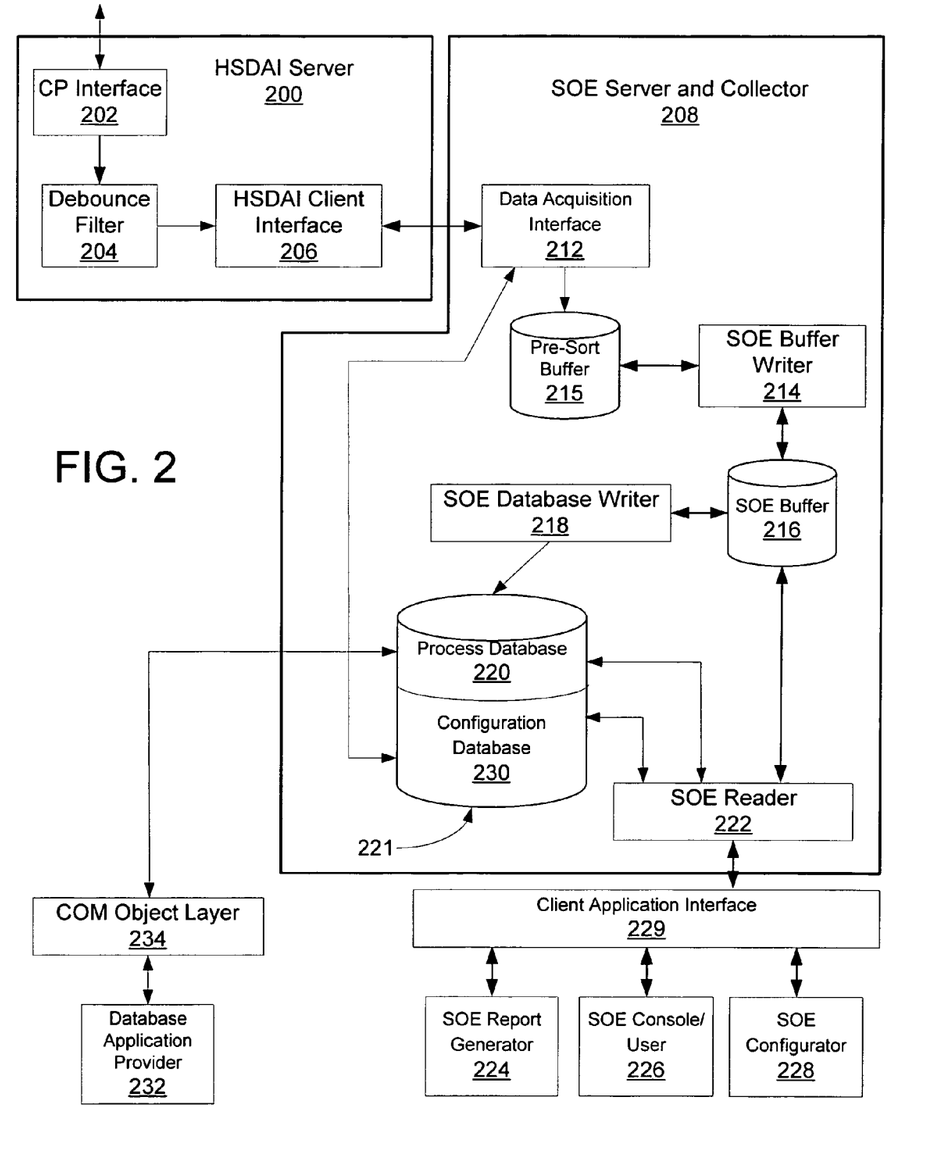
FIG. 2 is a schematic diagram of a sequence of events (SOE) facility incorporated into a workstation node communicatively coupled to a control processor that provides event data to the workstation node.

A sequence of events (SOE) facility is described, by way of a detailed illustrative example, herein below. An exemplary control system environment including a workstation having an SOE facility is depicted in FIG. 1. Thereafter, FIG. 2 provides an exemplary arrangement of functional components that execute on the workstation to facilitate receiving and providing user access to event data generated by the control system.

Turning to FIG. 1, an exemplary simple industrial control system arrangement/environment is depicted wherein an exemplary sequence of events recorder facility is incorporated. A workstation 102, comprising a variety of field device configuration and monitoring applications, including a sequence of events facility, provides an operator/engineering interface through which an engineer/technician monitors the components of a control system. The sequence of events facility comprises a set of integrated components (including data transfer interfaces and buffers) executing on the workstation 102. The set of integrated components facilitate receiving a large volume of synchronized/timestamped event data (from an extensible set of event source types) across potentially multiple control processor nodes in a short period of time, sorting the received event data, and providing the event data to an extensible set of clients via a runtime buffer (able to receive large volumes of event data in a short period of time) as well as a database supporting long-term storage of the received/sorted event data.

The workstation 102 comprises any of a variety of hardware/operating system platforms. By way of example, the workstation 102 comprises a personal computer running any of a variety of operating systems such as: Microsoft Windows XP, Unix, Linux, Solaris, Mac OS-X, etc.

In the illustrative example, the workstation 102 is connected in a redundant configuration via dual Ethernet interfaces/wiring to redundant Ethernet switches 104 and 106 (via a redundant network link 105 or alternatively a mesh network providing redundant network paths between networked nodes). The Ethernet switches 104 and 106 are commercially available and provided, for example, by Allied Telesyn (e.g., model AT-8088/MT). While not specifically depicted in FIG. 1, additional nodes, comprising workstations, servers and other elements (e.g., high level control module assemblies) of a supervisory portion of the control system are potentially connected to the redundant switches 104 and 106.

The switches 104 and 106 (as well as potentially other non-depicted switches) are also communicatively coupled to a control module assembly 108. The control module assembly 108 comprises one or more control modules (also referred to as control processors) that execute control programs driven by process sensor data values and render output values to devices (e.g., valves, motors, etc.) controlling a plant process. An illustrative example of such control module is a FOXBORO CP model FCP270, by Invensys Systems, Inc. In other embodiments, process control functionality is carried out in any of a variety of control modules—even by control programs incorporated into the workstations, intelligent transmitters, or virtually any communicatively coupled device capable of executing control programs, loops, scripts, etc.

In the case where the control module assembly 108 is the FOXBORO FCP270, workload is divided, within the FCP270, between controlling data communications and executing control programs (blocks). The FCP270 processes data received from an I/O module assembly 110 in parallel using the two distinct hardware modules—a block processor module and a field communications module. The block processor module repeatedly executes control programs according to a relatively long block processing cycle period (e.g., 100 ms). The output values of the control programs executed within the block processor module are driven by the process data received by the control module assembly 108 from the I/O module assembly 110. The I/O module assembly comprises, by way of example, INVENSYS FBM207 and/or FBM217 fieldbus modules that pass digital input values to the control module assembly 108.

With regard to the data communications task, the field communications module within the FCP270 receives data from the I/O module assembly 110 and passes the received data to both the above-mentioned block processor module and to process data subscribers (e.g., applications running on the workstation 102) according to an appropriate network communication protocol (e.g., TCP/IP) via the redundant network link 105. An example of such an application running on the workstation 102 is a sequence of events facility. To reduce the volume of data on network link 105, only events (i.e., changes in logic states of observed status variables) are passed to the sequence of events recorder facility on the workstation 102. A user determines which events are passed to the workstation 102 on an individual FBM channel basis.

The field communications module within the control module assembly 108 applies a timestamp to data received from the I/O module assembly 110 prior to passing the process data to a process data subscriber via the network link 105. In the exemplary embodiment wherein the control module assembly 108 comprises a FOXBORO FCP270, the timestamp is applied with a granularity of 1 ms—significantly smaller than a typical block execution repetition period (100 ms). Furthermore, the timestamp clock of the control module assembly 108 synchronizes with other clocks within the control system using a broadcast wireless timing signal (e.g., a global positioning system (GPS) clock signal) to synchronize with other clocks within the system. The accuracy of the timestamps assigned by the field control module to received process data is therefore maintained to within about 1 ms. The FCP270, in separating the block processing and communications aspects of a control module assembly, facilitates applying differing timing standards to block processing and communications.

With continued reference to FIG. 1, the I/O module assembly 110, alternatively referred to as a field bus module (FBM), is communicatively coupled to the control module assembly 108. Communications protocols utilized for carrying out communications between the I/O module assembly 110 and control module assembly 108 are potentially any one of a variety of proprietary/non-proprietary communications protocols. In one embodiment, the digital data communications between the control module assembly 108 and I/O module assembly 110 are carried out via a 2 MBit HDLC communication protocol. While only a single I/O module assembly 110 is depicted in the illustrative example, control systems embodying the present invention potentially comprise many I/O module assemblies.

I/O module assemblies, in general, incorporate one or more of a variety of specialized interfaces for communicating directly and/or indirectly to a variety of device types, including sensors/actuators embodying particular communications protocols, located at distributed locations in a plant. In the illustrative example, the I/O module assembly 110 comprises a Foundation Fieldbus I/O module (e.g., an Invensys field bus module model FBM228) that supports communications between the control module assembly 108 and field devices coupled to a Foundation Fieldbus network 111. In the illustrative embodiment, a set of representative intelligent field devices 114 and 116, containing multiple application-dependent configurable parameters, are connected to the Foundation Fieldbus network 111. The field devices 114 and 116 operate at the lowest level of an control system to measure (transmitters) and control (positioners, motor switches, etc.) plant activity. A termination assembly 112 communicatively couples the I/O module assembly 110 to the field devices 114 and 116. The termination assembly 112 provides power and power conditioning to the extent needed by the field devices 114 and 116 on the network 111.

In the illustrative embodiment, the control module assembly 108 (e.g., an FCP270) receives digital data transmitted by a plurality of communicatively coupled field devices (through the I/O module assembly 110). The FCP270 control processor applies a timestamp to data received from the I/O module assembly 110 with a time-based resolution of 1 ms. In an exemplary embodiment, the control module assembly 108 forwards the timestamped data to a sequence of events processor/application running upon the workstation 102 on an input change-driven basis (i.e., only changes to values of digital signals are transmitted to the workstation 102). The 1 ms granularity of timestamped data enables a sequence of events processor/application on the workstation 102 to assign a temporal order to a series of rapidly occurring events—such as a series of cascading failures in a plant. The relatively small timestamp resolution improves the likelihood of being able to establish a temporal order to a set of cascading events when compared to an arrangement where digital data is timestamped according to a block refresh period (e.g., 100 ms).

In an illustrative embodiment, the control module assembly (e.g., FCP270) obtains and timestamps the received digital (i.e., true/false) input values associated with a signal channel. To reduce data traffic on the network links 105, the control module assembly 108 only passes changes to the logical state of the signal channel (i.e., it passes events) to the workstation 102. In particular, the timestamped state changes of the signal channel are passed to a sequence of events processor/recorder running on the workstation 102. Thus, when the logical state of the digital input signal channel changes, an event is registered for the digital input along with a timestamp associated with the logical state change. In turn, a sequence of events application running on the workstation 102 creates a set of time-ordered logical changes within a specified time interval for one or more digital signal channels. Such sequences of events can be used to analyze a progression of cascading failures in their temporal order and thereby determine a source of a process failure.

By way of example, the I/O module assembly 1 10 comprises one or more I/O cards that execute firmware/drivers that digitize signals received from the link 111 via the termination assembly 112. As mentioned above, such data is received at a comparatively high refresh rate (e.g., every 1 ms) by the control module assembly 108 (e.g., FCP270). The data is timestamped at the time it is received by the control module assembly 108. In the illustrative embodiment, buffers are expanded in the I/O module assembly 110 to accommodate potential backups due to temporary communication disruptions between the I/O module assembly 1 10 and the control module assembly 108. When communications are restored, there is potentially a very large volume of data that will be passed in a short period of time from the I/O module assembly 110, through the control module assembly 108, and to the workstation 102 comprising the SOE facility. The SOE facility includes an intermediate buffer capable of temporarily storing large quantities of event data to ensure that intermittent bursts of data do not overflow smaller external interface buffers.

Having described an exemplary network environment within which a sequence of events facility is incorporated, attention is directed to FIG. 2 wherein an exemplary set of components associated with an SOE facility are depicted. The illustrative components of the SOE facility, residing on the workstation 102, cooperate to receive event data from a potentially large number of sources through established connections, buffer the received data, and process and display the buffered event data in a way that is meaningful and readily understood by a user. The set of event sources monitored/tracked by the SOE facility is specified, for example, by a set of channels on identified fieldbus modules within a configuration table/file stored within an SOE database. Such configuration information can be provided in a variety of ways including downloading the data or through a configuration client application associated with the SOE facility (e.g., running on the workstation). Thereafter, during runtime, the SOE facility receives and buffers the tracked events in an intermediate buffer of sufficient size to prevent overflow during a widespread control system failure that creates a tracked event storm as various alarms are tripped and exceptional operation states are sensed.

The buffered events are thereafter provided to multiple event data sinks. The buffered data is made available to operator clients in the form of, for example, a time-ordered sequential event log rendered on a streaming basis to a display client or printer. Alternatively, the buffered event data is stored within an SOE database providing enhanced report generation and event data filtering/presentation options. In an illustrative embodiment, a single SOE data reader interface provides access, by operator clients, to the event data regardless of whether the data comes directly from the intermediate buffer or indirectly via the SOE database. A separate database application/provider also provides remote access to the tabled event data without the need of the SOE data reader.

Turning to FIG. 2, the sequence of events facility executing on the workstation 102 receives event data through a high speed data acquisition interface (HSDAI) server 200. The HSDAI server 200 manages connections and communications between the SOE facility on the workstation 102 and sources of events representing the operation and/or status of a control system. The HSDAI server 200, by way of example, supports TCP/IP connections between the workstation 102 hosting the SOE facility and any of a variety of event sources providing digital inputs. One type of event source is a control module assembly, such as control module assembly 108 having a field communications module for carrying out communications with the workstation 102 to provide event data having a resolution of 1 ms. In the case where event data is received from the control module assemblies, connections set up by the HSDAI server 200 specify I/O module assemblies (e.g., assembly 110) and channel number(s) from which events are received. While a specific type of event source (i.e., control module assembly) is identified above, the HSDAI server 200 is generic in the sense that it can receive data from a variety of digital/logical data sources to which it can connect (e.g., TRICONEX safety shut down units as well as non-proprietary computers or PLC controllers which support TCP/IP communications).

In the illustrative embodiment, the HSDAI server 200 includes a control processor (CP) interface 202 for carrying out communications with a source of event data (e.g., the control module assembly 108). The control processor interface 202 implements communication protocols that are tailored to the control processor event data source. The control processor interface 202 represents the functional connection to a control processor. Physically, the CP interface 202 is associated with a physical connection to a physical link such as the above-described network link 105.

The HSDAI server 200 stores received event data within one or more buffers associated with a set of intended destinations of the event data. Having dedicated buffers accommodates passing received data to multiple data sinks have differing roles, timing, etc. It is noted that the multiple buffers can be accommodated, potentially, by using multiple pointers to a single set of buffered data. In the illustrative example a HSDAI client interface 206 handles event data destined for an SOE server and collector 208. The HSDAI client interface 206 receives and buffers event data stamped with a GPS synchronized time value having a resolution of one ms for processing by the SOE server and collector 208.

Transferring data between the HSDAI server 200 and the SOE server and collector 208 is accomplished using a push/publishing mechanism wherein transfers of received SOE data from the HSDAI server 200 to a data acquisition interface 212 of the SOE server and collector 208 are initiated by the HSDAI client interface 206 in accordance with a previously configured set of requested RTP change notifications. Alternatively SOE data transfers occur through a polling mechanism wherein the data acquisition interface 212 initiates transfers through period requests for updated change notification information from the HSDAI server 200.

The HSDAI server 200 also implements a debounce filter 204—interposed between the CP interface 202 and the HSDAI client interface 206 in the illustrative example. The debounce filter 204 implements a debounce filter algorithm that eliminates transient spikes such as those caused, for example, by mechanical relay rattle. Debounce processing carried out by the filter 204 suppresses signal state change spikes wherein a signal initially changes state, but returns to its previous logic state before expiration of a configured debounce period (tdeb) that begins when the initial signal state change occurs. A debounce period is, by way of example, expressed in milliseconds. Thus, when a signal changes its logic state from 0 to 1 or from 1 to 0 the signal must be stable for more than tdeb milliseconds before state change is passed by the HSDAI server 200 to the SOE server 208. Upon completion of the debounce period (tdeb) without the point value/signal returning to its previous logic state, the HSDAI server 200 allows the point value change to be passed to the SOE server 208 with a timestamp equal to the beginning of the successfully completed tdeb period. The debounce filter 204, in contrast to an analog filter, does not change (delay) a time associated with an event—though initial reporting (passing) of the event to a client of the HSDAI server 200 is potentially delayed until a debounce period ends. Point value signal state changes that persist for less than the tdeb period are suppressed by the debounce filter 204. It is noted that the debounce filter 204 is depicted as a separate functional component in FIG. 2. However, in embodiments of the invention the debounce filter 204 functionality is incorporated into one of the other components of the HSDAI server 200 (e.g., the CP interface 202 or the HSDAI client interface 206).

Having described an exemplary high speed data acquisition interface (HSDAI server 200) attention is directed to the SOE server and collector 208. By way of example, the SOE server and collector 208 is implemented as a COM EXE Server and consists of a set of components, described herein below, running in separate threads in a process space allocated to the SOE server and collector 208. Other computer architectures for implementing the SOE server and collector 208 are contemplated in alternative embodiments of the invention.

An SOE buffer writer 214 obtains event data from the HSDAI client interface 206 through the data acquisition interface 212. The SOE buffer writer 214, operating as an agent of an SOE data buffer 216, obtains/extracts event data received from the HSDAI server 200 via the data acquisition interface 212 and writes the event data to the SOE data buffer 216.

Figure 4:
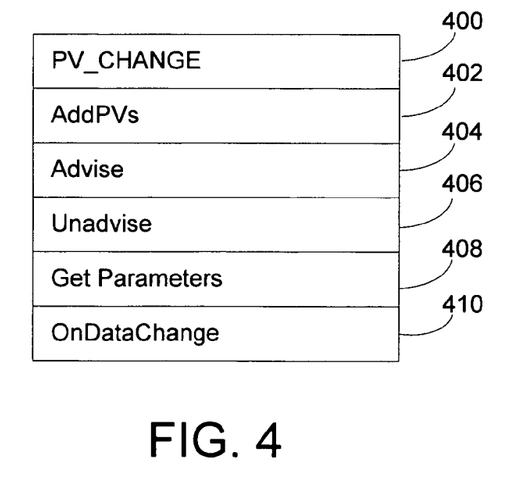
FIG. 4 summarizes a data acquisition server/client communications interface for an SOE facility.

In an exemplary embodiment, point value changes are received by the data acquisition interface 212 in the form of an array of point value change structures (see, PV_CHANGE 400 described herein below). The received arrays of point value change structures are unpacked by the data acquisition interface 212 and passed to a pre-sort buffer 215. After a pre-configured delay period expires for the received point value changes, the buffer writer 214 extracts the oldest timestamped point values from the pre-sort buffer 215. Thus, the buffer writer 214 pre-sorts the received point value changes, which may have initially been received out-of-order by the data acquisition interface 212, by timestamp and stores the point value changes, in time order, in the SOE data buffer 216 (one value change per stored record).

In an embodiment of the present invention, data is stored in chronological order (based upon timestamp) within sequential data space of the SOE data buffer 216. Thus, the buffer writer 214 enforces an initial hold period for each received point value change based upon a configured delay period (measured from the originally assigned timestamp) within the pre-sort buffer 215 to ensure that all subsequently received events (data point value changes) have later timestamps than the held point value change. The hold period (e.g., four seconds—generally some time period exceeding the specified debounce period) ensures that data that has been delayed (e.g., by the debounce filter 204 or a slow network link) will not be placed within the SOE data buffer 216 after a data point record having a later timestamp (violating an ordering rule of the SOE buffer 216). The configured delay period must be greater than the largest debounce period for an RTP. Therefore, the SOE buffer writer 214 will track the largest debounce period and compare it to a user-specified pre-sort delay period before determining the configured delay period.

In an alternative embodiment, the SOE buffer 216 is implemented as a time-sorted bi-directionally linked list of timestamped events. Such arrangement avoids the need for the pre-sort buffer 215 and delaying storing the received events in the SOE buffer 216. It does not eliminate the need to hold data received by the data acquisition interface 212 for a period to ensure that events are, to the greatest reasonable extent possible (in view of de-bounce filtering), reported to SOE clients in chronological order.

The SOE data buffer 216, an intermediate buffer within the SOE collector and server 208, is the primary source (whether direct/indirect) of accumulated event data for clients on, and remotely connected to, the workstation 102. The SOE data buffer 216 performs a time-sorted event data accumulation function with regard to received event data. In the illustrative embodiment the sorting function, carried out by the buffer writer 214 in association with the pre-sort buffer 215, re-establishes ordering of event data according to previously assigned timestamps. Such out-of-order reception of event data can arise from, for example, debounce filtering or disrupted communications between the workstation 102 and event data sources such as control processors.

The SOE data buffer 216 serves as more than a buffer to ensure that data is not lost prior to storing in a database. As will be explained further herein below, the data from the SOE data buffer 216 is indeed copied to a database providing archival access to the process event data. However, the SOE data buffer 216 is also used as a source of chronological event log data streams for requesting client applications. Thus, rather than immediately deleting the data from the buffer 216 after copying the event data to the database, the SOE data buffer 216 maintains the received event data until a need arises to free space within the buffer 216 to store more recently received event data. When additional space is needed, the event data entries having the oldest timestamps are removed. Holding particular received event data until the buffer space is needed to store new event data facilitates extracting a chronological list of most recently received event data without resorting to complex database queries and associated potentially lengthy database response delays.

In a particular embodiment, the SOE data buffer 216 is implemented as a circular/ring buffer of event data stored in chronological order. By way of example, the buffer 216 has a configurable capacity for storing up to 1 million pieces of event data without overwriting previously stored events. However, the capacity of the buffer 216 varies in accordance with various environments within which the SOE facility operates. Furthermore, the SOE data buffer 216 potentially comprises multiple sub-divisions (buffers) that receive information routed by the buffer writer 214 according to a data sorting definition specified for the SOE facility on the workstation 102.

The SOE server and collector 208 tracks a number of operational status parameters relating to the buffer 216. Overflow of the buffer 216 (e.g., the oldest buffered data had not yet been written to the process database 220 when the circular buffer 216 became filled, a client request for an event log specified a time no longer within the range of the event data in the buffer 216, etc.) is detected and reported by the SOE server and collector 208 (prompting an operator to consider increasing the size of the buffer 216). Other recorded/reported parameters include average number of stored events per minute and fill rate of the circular SOE data buffer 216.

An SOE database writer 218, associated with a multi-purpose control system database 221, receives event data from the SOE data buffer 216 and writes the received data to the process database (e.g., an AIM* Historian) 220 portion of the multi-purpose database 221. The SOE database writer 218, by way of example, is implemented by a separate worker thread within the SOE server and collector 208, which acts as a collector agent for a potentially non-local process database (in the event that the process database 220 does not reside on the workstation 102). Whenever there are events in the SOE data buffer 216 the SOE database writer 218 extracts the data from the buffer 216 and tries to store it into the process database 220.

Another aspect of the SOE facility is the configurable/customizable creation of output logs and reports to meet a variety of needs. Data stored within the process database 220 is accessed by client applications either directly or indirectly (via an SOE reader thread 222 described herein below). In an exemplary embodiment, the rate at which the SOE database writer 218 writes event data to the process database 220 is potentially at a rate significantly below the maximum data transfer rate between the HSDAI server 200 and the SOE Server and Collector 208. The SOE data buffer 216 facilitates accepting sudden bursts/showers of event data from the HSDAI server 200, sorting the received event data, and forwarding the event data to the database writer 218 for storage in the process database 220 without data loss.

In the illustrative embodiment, the SOE reader thread 222 within the SOE server and collector 208 responds to requests for event data from an extensible set of SOE clients (e.g., SOE report generator client 224, SOE console/user interface client 226, and SOE configurator 228) running on, or alternatively remotely connected to, the workstation 102. Each SOE client is generally configured by specifying an SOE server and collector instance (e.g., SOE server and collector 208) and an SOE printer with which the SOE client is associated.

The SOE reader 222 is used by the SOE clients to access event data received by the SOE server and collector 208. The SOE reader 222 supports two distinct sources of event data records that have been received by the SOE server and collector 208. For display of current events (those still present in the SOE data buffer 216), the reader 222 accesses the SOE data buffer 216. For display of a history of events associated with one or more designated points or a set of events over a period of time that is not represented in the SOE data buffer 216, the data reader 222 retrieves SOE data from the database 220. In an embodiment of the invention, the data reader 222 employs data source selection algorithms to automatically select the source (buffer 216 or database 220) for obtaining SOE data based upon the availability/intended use of the information requested by the client. The source of the collection of SOE data (e.g., the SOE data buffer 216 or the process database 220) retrieved by the reader 222 is transparent to the requesting SOE clients 224, 226.

In the illustrative embodiment, the extensible set of clients issue requests for event data records to the SOE reader thread 222 via a defined application interface 229 embodying standard inter-process request/response protocols (e.g., COM/DCOM). The SOE reader thread 222, in response, obtains the requested data from either the SOE data buffer 216 (runtime) or the process database 220 (archival). The data from the buffer 216 is relatively fresh and provided in the form of an unfiltered, time-sorted stream of timestamped event records. The direct path from the SOE data buffer 216 is utilized, for example, to provide a continuous stream of records constituting a complete event log providing a continuously updated list of received events for designated RTPs. The data from the process database 220 is less fresh, due to database query processing delays, but the contents of the process database 220 can be selectively extracted, and presented in a report, according to a variety of alternative database queries and sorting criteria specified by the SOE clients. Thus, each source of event data for the SOE reader thread 22 has its advantages.

With continued reference to FIG. 2, the extensible set of SOE clients includes the SOE configurator 228. By way of example, the SOE configurator 228 presents configurable parameters via a graphical user interface. A configuration database 230 in the multi-purpose database 221 associated with the SOE server and collector 208 stores configuration definitions (including specified parameter values associated with designated FTPs) specified through the SOE configurator 228 (and interfaced via the SOE Reader 222—that also supports writing configuration information to the configuration database 230). In an exemplary embodiment the configuration definitions are stored within the configuration database 230 as a set of records corresponding to watched RTPs.

The SOE configurator 228 facilitates defining SOE reports and logs containing configurable collections of data arranged in a defined format. The SOE configurator 228 supports designating event data sources (e.g., real-time points associated with digital FBM I/O channels) obtained by the HSDAI Server 200 on behalf of the SOE server and collector 208. In an exemplary embodiment, each data source—also referred to as a real-time point (RTP)—is identified by a unique tag ID generated from a combined compound name, block, and parameter identification set. Alternatively, the unique tag ID is generated from: an I/O module assembly, communication module, control processor, and I/O module channel for an RTP.

The SOE configurator 228 supports defining reports and logs. The reports and logs contain timestamped events corresponding to specified ones of a superset of all the RTPs watched by the SOE server and collector 208. Report and log templates are provided from which users can generate custom SOE data collections via any of a variety of output modes (e.g., line/page printers, graphical display consoles, etc.). A graphical user interface presents a set of user-selectable sequence of event points from which a report/log is defined. By way of example, a set of configured RTPs are arranged within a tree structure according to their affiliation with particular I/O modules (e.g., FBMs). Alternatively, the points are presented under associated plant equipment and/or control processors.

Once selected points (RTPs) are imported into a particular configured set of points, a user customizes generic descriptive text (e.g., on/off) by providing more meaningful terms for the on/off or true/false statuses of points—such as "Valve Open" or "Valve Closed" for a point corresponding to the status of a monitored valve. Examples of other user-customizable point parameters include: a point's assigned name, a description field, a valid-since timestamp, and a debounce period (overriding a default debounce period described herein below). An activated field facilitates enabling/disabling data collection on an RTP basis.

In addition to defining input event sources, the SOE configurator 228 also facilitates defining a set of parameters affecting the general operation of the sequence of events facility running on the workstation 102. Configurable operating parameters include:

A time delay between event detection (assigned timestamp) and the time at which the collected data is stored in timestamp-order by the SOE buffer writer 214 within the SOE data buffer 216. The time delay imposed by the SOE buffer writer 214 will always exceed the largest debounce delay period.

A size of the SOE data buffer 216 (e.g., the number of event records). In an embodiment, the size of the buffer 216 is dynamically determined by an algorithm that takes into account the occupied portion (current number and current size) of the buffer and the average rate at which new events (per minute) are being received. These statistics are viewable, along with other performance data, such as number of buffer overruns, maximum rate of new SOEs, total SOE count before/after applying debounce. The statistics are presented via a control console display screen provided by the configurator 228.

A default debounce period, or the time period a signal must be stable before its change in state is processed. A debounce filter, based upon a specified debounce period, suppresses relay rattle and other transient signal spikes lasting only a short time period before returning to a stable state. A debounce filter, in contrast to an analog filter, does not change (delay) a time associated with an event—though initial reporting of the event is potentially delayed until a debounce period ends. This value can be overridden by specifying a debounce period for an individual RTP.

Initial states of runtime point values, and whether to ignore an initial state change from a not initialized state at restart.

Alternatively, an option to suppress an initial state change is not configurable and instead the SOE server and collector 208 applies an algorithm for handling state changes for all runtime points upon restart. The following summarizes this handling of initial states:

If an RTP was at a particular state before the SOE facility went off-line and the RTP is still at that state up until the SOE came back on-line (with no intermediate changes—events—in between), then the current RTP value should be compared to the last stored value within the database 220 and not report or store this new value because no change has occurred.

If an RTP was at a particular state before the SOE facility went off-line and there were one or more changes in state during that time, then every new state change should have been timestamped and stored in the I/O module prior to being passed to the HSDAI interface 200 when the SOE facility came back on-line. Thus, all new events (new state changes) that occurred during the off-line period should be processed, buffered in the SOE buffer 216 (for immediate reporting) and archived in the process database 220.

If an RTP was at a particular state before the SOE facility went off-line and that RTP had no previous events stored in the process database 220 when the SOE facility came back on-line, the following is reported:

Current Report : "Not yet initialized"

Historical Report : "Not yet initialized"

Current Log : "empty", since no value change happened

Historical Log : "empty", since no value change happened

The aforementioned handling of the RTP with no previous event history at restart also applies to RTPs that are configured online and don't have a previous event stored in the process database 220.

A name of the process database 220.

An identification (e.g., name) of a particular printer, or printers, for printing SOE reports and logs (automatic, on-demand).

A time standard, e.g., Universal Coordinate Time (UTC), local, etc.

A maximum number of rows in the SOE tables that make up displayed reports and logs.

Memory locations of configurable report, log, and configuration templates.

With regard to runtime functionality, the SOE recorder facility on the workstation 102 supports the previously mentioned SOE console/user interface client 226. The SOE console/user interface client 226 presents a set of menu options/controls that, in turn, initiate creating visualizations of event data retrieved from either the buffer 216 or the database 220 in the form of reports and logs. Selectable controls on the SOE console/user interface client 226 initiate generating printouts of formatted copies of event data collections. In the illustrative embodiment, the SOE reader thread 222 responds to requests from the SOE console/user interface client 226 and accesses the received/stored event data. The SOE console/user interface client 226 supports: operating in a real-time mode wherein event data is provided directly from the buffer 216, and operating in a historical mode wherein archived event data is provided from the database 220.

Yet another suitable client within the exemplary extensible set of SOE clients is the SOE report generator client 224 for visualizing and/or printing runtime (via buffer 216) or archive (via database 220) event data.

Extensibility of the set of supported runtime SOE clients is facilitated by well-defined interfaces.

Furthermore, it is noted that the SOE clients may reside upon the same machine as the SOE server or alternatively a remote/networked machine. In the case where the SOE clients reside on the workstation 102 containing the SOE server and collector 208, the client applications communicate with the SOE reader thread 222's API via COM-supported calls. Alternatively, remote SOE client applications communicate via DCOM-supported calls (wrapped in TCP/IP packets) to the reader thread 222's API.

Finally, the illustrative SOE server and collector 208 also supports a database application provider 232 that, like the SOE reader thread 222, is capable of querying the process database 220 via COM/DCOM supported API calls through a COM object layer 234.

Figure 3:
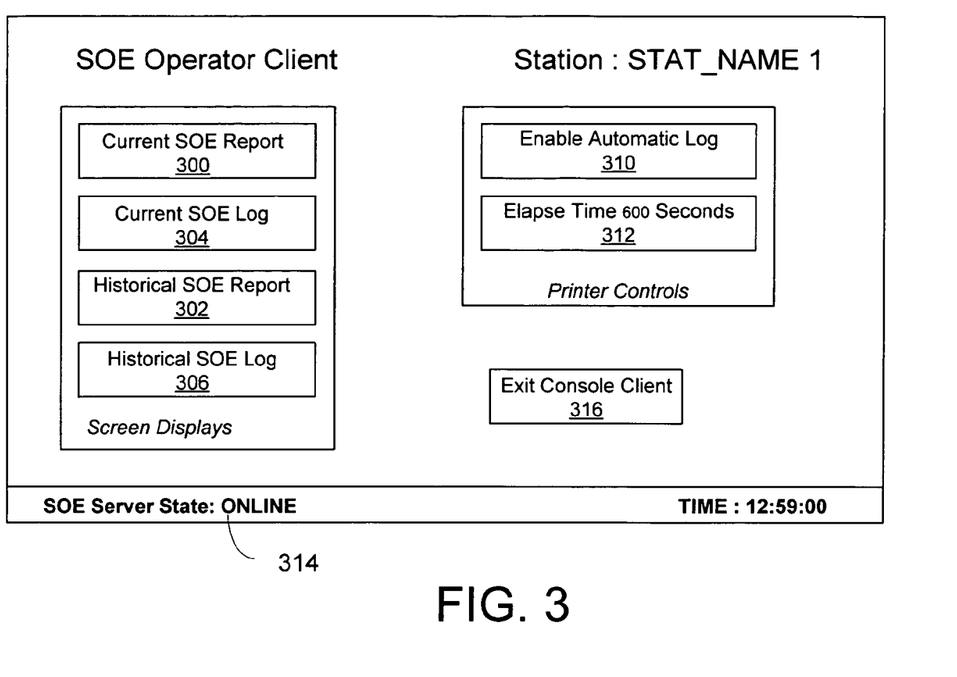
FIG. 3 is an exemplary user interface of an operator user interface supported by the SOE recorder facility.

Turning to FIG. 3, an exemplary main display rendered by the SOE console/user interface client 226 is displayed. From the main display user interface of the SOE console/user interface client 226 a user can: display (including print) SOE reports or logs, activate automatic printing of a current SOE log, and print a currently accessed page.

The exemplary embodiment of the SOE console/user interface client 226 supports four types of screen displays for rendering event data. A report view documents the statuses of designated digital points sorted by ID at a specified point in time. More particularly, a report comprises a single value/entry for all inputs in a report set—sorted by ID, the time at which the input last changed (within a millisecond), a description of the input, and the state to which the input changed at the listed time. A user selects, via the user interface, a Current SOE Report button 300 or Historical SOE Report button 302 depending upon whether a report is to be rendered from the buffer 216 (based on the current time) or the database 220 (based upon a non-current time), respectively. In the case of a historical SOE Report, a user designates a point in time for which the states of a set of points are to be rendered for display/printing.

In accordance with embodiments of the invention, event filters/masks support selective presentation of the contents of the buffer 216 and/or database 220 via the SOE console/user interface client 226. Such filtering/masking defined during configuration and/or during runtime of the interface client 226, potentially enhances readability of reports/logs created from event data extracted from the buffer 216 and/or the database 220 for a large number of event sources (e.g., FBM channels).

A log view documents a complete set of events sorted by timestamp over a specified time span and rendered in the form of line entries (one line per event). Thus, the log not only shows the last change of an input (i.e., event) based upon a designated time, but also every change (event) that led up to the last change in a specified viewing window. Each log line entry includes, by way of example: a point ID (RTP name), a time at which the point changed state, a point description, and a state to which the point changed. The SOE console/user interface client 226 supports viewing/selecting a current SOE log by selecting a Current SOE Log button 304 or a historical SOE log by selecting a Historical SOE log button 306 (and submitting a particular time of interest). When a user selects the Current SOE Log button 304, the SOE console/user interface client 226 begins receiving events for a set of designated event sources in a particular log configuration. A user suspends automatic updates to the sequentially displayed list of events in the SOE console/user interface client 226 while operating in the Current SOE Log mode by selecting a Freeze/Update user interface button on the corresponding user interface. The relatively fine granularity (e.g., 1 millisecond) of the event data facilitates tracking a sequence of cascading faults by observing a sequentially ordered set of log entries displayed in a current/historical log view.

Upon selecting one of the four screen display options described above, a current/historical report/log is displayed on a graphical user interface. Each of the screen display interfaces supports printing a current page and printing an entire report. The event information provided on a display and in printed output is identical. However, the display supports a set of navigation controls as well as the aforementioned print options.

The SOE console/user interface client 226 main display depicted in FIG. 3 also supports printer controls associated with event logs. An Enable Automatic Log button 310 toggles the SOE console/user interface client 226 between enabling/disabling automatic log printing. When automatic log printing is enabled, all log data received by the SOE console/user interface client 226 from the SOE server and collector 208 is rendered to a designated printer—without waiting for a further print command. When printing a log to a page printer, a next page is generally not printed until a specified/designated set of event records have been accumulated. If event records are being generated at a very slow rate, accumulated event records can become stale (waiting for sufficient numbers of records to print). An elapse time field 312, associated with the aforementioned automatic log printing feature operating in a page printer mode, specifies a maximum period (e.g., 600 seconds) between printing a last log page and a next log page. Thus, if a configured time period has elapsed since a last page was printed, then the log printer will automatically print the currently accumulated set of event records on a partially filled sheet of paper. Since a line printer prints the even records as they are received, this field is inapplicable to line printer operation.

With continued reference to FIG. 3, a server state box 314 specifies the status of the SOE server and collector 208 from which the SOE console/user interface client 226 receives event data. An online status indicates that the SOE server and collector 208 is capable of forwarding events to the SOE console/user interface client 226. An offline status indicates that the SOE server and collector 208 is presently unable to forward events to the SOE console/user interface client 226. A user closes the SOE console/user interface client 226 by selecting the Exit Console Client button 316.

Having described a set of sequence of events interface functions supported by the SOE console/user interface client 226 having access to SOE data provided via the SOE Server and Collector 208, attention is directed to exemplary server/client communications interfaces that facilitate acquiring the event data and placing the event data in buffers/databases for subsequent distribution to SOE console/user interface client instances such as the one described herein above.

The HSDAI server 200 includes a COM-based server that implements a set of methods/functions described herein below.

Turning to FIG. 4 an exemplary server/client interface for the HSDAI server 200 and the data acquisition interface 212 comprises a set of functions through which the SOE data acquisition interface 212 subscribes to event data points and starts/stops a data change callback mechanism. A PV_CHANGE record 400 is a structure utilized to pass each reported data point value change from the server 200 to the data acquisition interface 212. The PV_CHANGE record 400 includes the following fields: a timestamp, present value of the data point, a present status of the data point, an internal identification number for the event data point, and a type (analog/binary) of the data point value.

An AddPVs method 402 is called by the data acquisition interface 212 to specify data points for which the data acquisition interface 212 seeks to receive change notifications. In an exemplary embodiment, previously subscribed data points that are not listed in a call to the AddPVs method 402 will be dropped by the server 200 when the set of subscribed points for the data acquisition interface 212 are updated. By way of example the AddPVs method 402 is called with the following parameters specified: a count—corresponding to the total number of subscribed points specified in the call; a pointer to a list of data point names; a pointer to a list of integer values comprising client-assigned data point IDs; and an output pointer to where error codes are stored for each subscribed data point.

An Advise method 404 is called by the data acquisition interface 212 to commence receiving change notifications from the server 200 via a callback interface implemented by the data acquisition interface 212. The advise method 404 call includes the following parameters: an input pointer to the callback interface implemented by the data acquisition interface 212 and an output pointer to a server supplied cookie.

An Unadvise method 406 is called by the data acquisition interface 212 to halt receiving change notifications from the server 200 after the interface 212 has previously invoked the advise method 404. The unadvise method 406 call includes the following input parameter: the cookie previously provided by the server during the advise method 404 call.

A get parameters method 408 enables a client to retrieve operating characteristics from the server 200 including: current number of connected clients, number of point value changes being served, buffer size, buffer space in use, maximum buffer space used, and transmit cycle (in milliseconds). Thus, this relatively small set of methods/operations enables the data acquisition interface 212 to extract point value changes from a process control system via the server 200.

The data acquisition interface 212 implements an even simpler interface. In the illustrative embodiment, the interface 212 interface implements a single function that facilitates receiving data point value change notifications. In particular, an OnDataChange function 410 enables the server 200 to transfer a set of changed data point values to the data acquisition interface 212. The changes are sent as a block, specified by an input integer value, and a pointer to the set of changed point values. The server sends changes at least every tenth of a second, but may send the point value changes more often. By way of example, the point value changes are accumulated into maximum sets of 50,000 changes.

Figure 5:
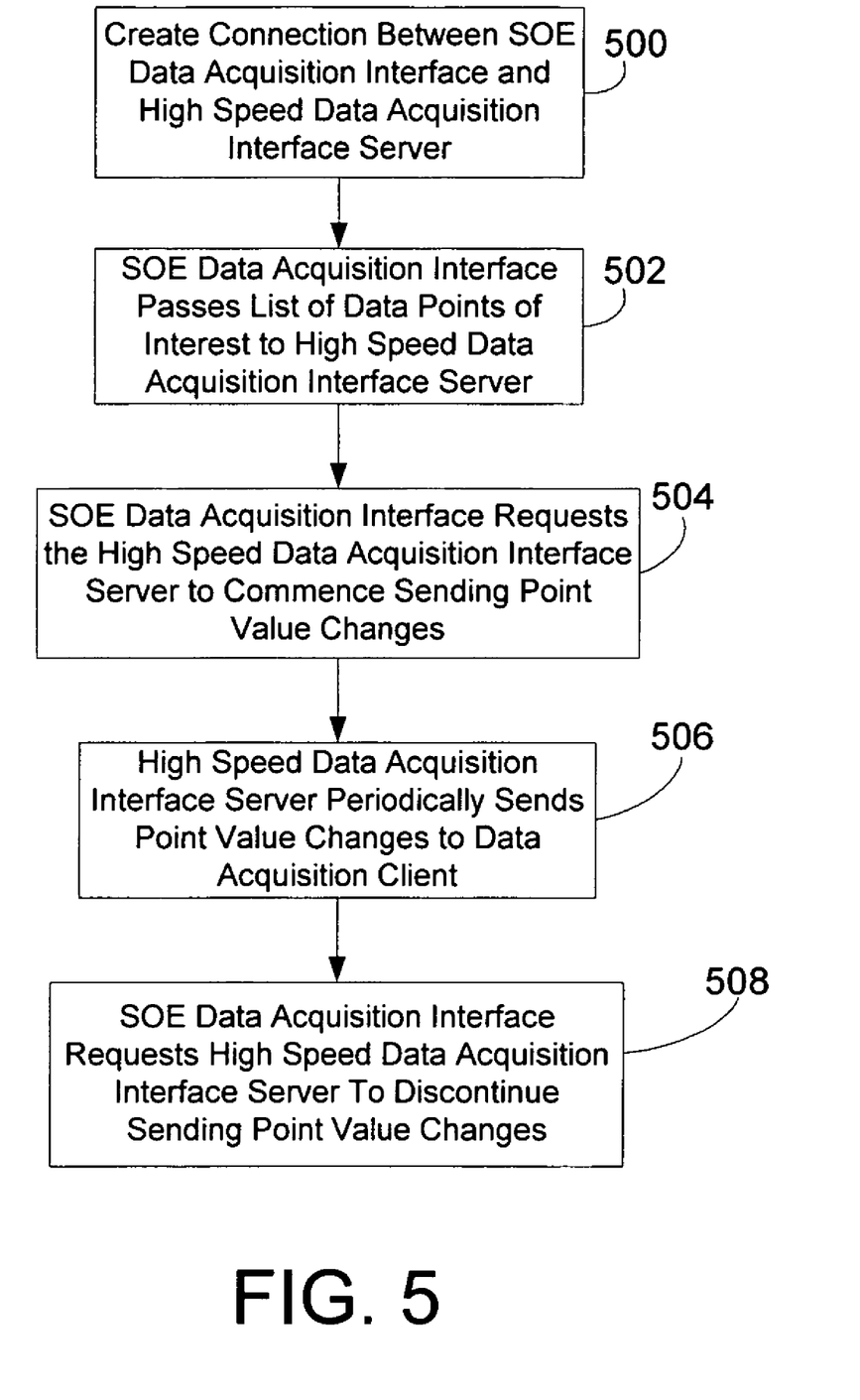
FIG. 5 is a flowchart summarizing the setup of the data acquisition interface.

Turning to FIG. 5, an exemplary set of steps are summarized for setting up a session/connection between the HSDAI server 200 and the data acquisition interface 212 contained within the SOE server and collector 208. During step 500, the data acquisition interface 212 connects to the HSDAI server 200 by requesting the server's HSDAI interface. The server 200 now has a connection to the interface 212. After setting up the connection, at step 502 the interface 212 passes, to the server 200, a list of data points (events) for which the interface 212 seeks to be informed of changes by the server 200. By way of a particular example, the interface 212 calls the AddPVs method 402 on the server 200's COM interface and passes the list of data points of interest based upon the contents of the configuration database 230. Upon completing the AddPVs method 402 the server 200 has registered the list of data points for which the interface 212 requests notification when an event status changes.

Thereafter, at step 504 the interface 212 calls the Advise method 404 of the HSDAI interface, to notify the server that the client has implemented a callback interface for carrying out the point value data transfers and to request the server 200 to commence sending sets of point value changes using the aforementioned PV_Change structure 400. Thereafter, at step 506 the HSDAI server 200 periodically informs the interface 212 of any changes through a call on the OnDataChange method 410 of the HSDAI callback interface implemented on the interface 212. In accordance with the illustrative embodiment, the interface 212 does not immediately transfer the received information to the SOE data buffer 216 (the runtime copy of SOE data). Instead, the interface 212 initially stores the received data in a pre-sort buffer 215. The pre-sort buffer 215 enables data to be held for a configurable period of time prior to being sorted and stored in timestamp order within the buffer 216. Thus, the pre-sort buffer facilitates accommodating delays in the SOE facility on workstation 108 receiving SOE data from various control processors (that may have experienced short transmission delays due to lost packets or brief disruptions to their connections). Alternatively, the SOE data buffer 216 includes sorting mechanisms and dynamic data insertion mechanisms that enable out of order data to be inserted at a location other than the end of the buffered data contained within the buffer 216. At some point thereafter, at step 508 the interface 212 calls the Unadvise method 406 of the HSDAI interface to notify the HSDAI server to stop sending event updates, and the client 200 terminates and disconnects from the server 212 by releasing the HSDAI interface acquired during step 500.

The structures, techniques, and benefits discussed above are merely exemplary embodiments of the invention. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Moreover, those of skill in the art will recognize that the disclosed principles are not limited to any particular local area network protocols and/or topologies. Therefore, the invention as described herein contemplates all such embodiments as may come within the scope of the following claims and equivalents thereof.

What is claimed is:

1. A networked computer including a computer-readable medium having computer-executable instructions for a sequence of events management facility for a process control network environment including control modules, the sequence of events management facility comprising:
   an event data interface for receiving timestamped event data originating from a digital field control process input and provided to the sequence of events management facility via a network communications link;
   a sequence of events server comprising:
      a process database for storing an archival copy of the received timestamped event data,
      an event buffer, interposed between the event data interface and the process database, for temporarily storing the event data received from the event data interface prior to storing the event data in the process database, and
      an event data client application interface providing access by sequence of events client applications to the timestamped event data received by the sequence of events management facility, thereby providing user access to sequence of event data based upon timestamped event data originating from a process control system; and
   an event sorting function that facilitates passing received timestamped event data in chronological order to the event buffer.

2. The networked computer of claim 1 wherein the event buffer stores the received timestamped event data in chronological order.

3. The networked computer of claim 1 wherein the event data client application interface provides multiple modes of access, by clients, to the timestamped event data including:
   a streaming mode wherein a chronologically arranged stream of event data is provided by the event client interface from the event buffer, and
   a query mode wherein archived event data is selectively retrieved by the event data client application interface from the process database in response to a database query.

4. The networked computer of claim 1 wherein the networked computer is a workstation including a graphical user interface.

5. The networked computer of claim 4 further comprising a computer-readable medium including computer-executable instructions for a set of client applications that interface with the sequence of events server.

6. The networked computer of claim 5 wherein the set of client applications interface with the sequence of events server via the event data client application interface.

7. The networked computer of claim 5 wherein the set of client applications includes a configurator for specifying operating characteristics of the sequence of events server.

8. The networked computer of claim 7 further comprising a computer-readable medium including computer-executable instructions for a configuration database for storing operating characteristics of the sequence of events server, wherein the configuration database includes a set of digital signals provided by the control module for which value changes are to be acquired by the event data interface.

9. The networked computer of claim 5 wherein the set of client applications includes an operator client for displaying received sequence of events data.

10. The networked computer of claim 9 wherein the operator client includes computer-executable instructions for displaying received sequence of events data in the form of an event report comprising a snapshot view of a set of watched digital points at a specified time.

11. The networked computer of claim 9 wherein the operator client includes computer-executable instructions for displaying received sequence of events data in the form of an event log.

12. The networked computer of claim 1 wherein the control module comprises a control processor.

13. The networked computer of claim 1 wherein the sequence of events server further comprises:
   a pre-sort buffer interposed between the event data interface and the event buffer; and
   an event buffer writer that writes data, retrieved from the pre-sort buffer, in chronological order to the event buffer.

14. The networked computer of claim 1 wherein the sequence of events server further comprises computer-executable instructions for a debounce filter that suppresses changes to a watched digital parameter that does not hold a new value for greater than a specified debounce period.

15. The networked computer of claim 1 wherein the sequence of events server includes computer-executable instructions for executing a restart algorithm that determines whether a digital signal value changed during an off-line period by at least comparing a received value for the digital signal to a last stored value, if one exists, in the process database.

16. The networked computer of claim 1 wherein the sequence of events server includes computer-executable instructions for a data acquisition client interface, and wherein the data acquisition client interface invokes functions supported by the event data client application interface via calls to an application interface exposed by the event data client application interface.

17. The networked computer of claim 1 wherein the event buffer maintains received event data until a need arises to free space to store more recently received event data.

18. The networked computer of claim 17 wherein the event buffer is a circular buffer containing chronologically arranged received event data.

19. A method for managing, by a networked computer including a computer-readable medium having computer-executable instructions for a sequence of events management facility, sequence of events data created in a process control network environment including control modules, the method comprising the steps of:
   receiving, by an event data interface, timestamped event data originating from a digital field control process input and provided to the sequence of events management facility via a network communications link;
   maintaining, by a sequence of events server, the received timestamped event data, the maintaining step comprising:
      temporarily storing, by an event buffer interposed between the event data interface and a process database, the received timestamped event data from the event data interface,
      copying the received timestamped event data from the event buffer to the process database, and
      providing, by an event data client application interface, access by sequence of events client applications to the timestamped event data received by the sequence of events management facility, thereby providing user access to sequence of event data based upon timestamped event data originating from a process control system; and
   providing, by a buffer writer, received timestamped event data in chronological order to the event buffer.

20. The method of claim 19 wherein the providing access step comprises: providing multiple modes of client access to the timestamped event data including:
   a streaming mode wherein a chronologically arranged stream of event data is provided by the event client interface from the event buffer, and
   a query mode wherein archived event data is selectively retrieved by the event data client application interface from the process database in response to a database query.

21. The method of claim 19 wherein the sequence of events server includes a configuration database and further comprising the step of:
   storing, within the configuration database, operating characteristics of the sequence of events server, wherein the configuration database includes a set of digital signals provided by the control module for which value changes are to be acquired by the event data interface.

22. The method of claim 19 further comprising:
   applying a debounce filter to received timestamped event data.

23. The method of claim 19 further comprising applying a restart algorithm that determines whether a digital signal value changed during an off-line period by at least comparing a received value for the digital signal to a last stored value, if one exists, in the process database.

24. The method of claim 19 further comprising:
   maintaining, by the even buffer, received event data until a need arises to free space to store more recently received event data.

25. A computer-readable medium including computer-executable instructions facilitating managing, by a networked computer-based sequence of events management facility, sequence of events data created in a process control network environment including control modules, the computer-executable instructions facilitating performing the steps of:
   receiving, by an event data interface, timestamped event data originating from a digital field control process input and provided to the sequence of events management facility via a network communications link;
   maintaining, by a sequence of events server, the received timestamped event data, the maintaining step comprising:
      temporarily storing, by an event buffer interposed between the event data interface and a process database, the received timestamped event data from the event data interface,
      copying the received timestamped event data from the event buffer to the process database, and
      providing, by an event data client application interface, access by sequence of events client applications to the timestamped event data received by the sequence of events management facility, thereby providing user access to sequence of event data based upon timestamped event data originating from a process control system; and
   providing, by a buffer writer, received timestamped event data in chronological order to the event buffer.

26. The computer-readable medium of claim 25 wherein the providing access step comprises: providing multiple modes of client access to the timestamped event data including:
   a streaming mode wherein a chronologically arranged stream of event data is provided by the event client interface from the event buffer, and
   a query mode wherein archived event data is selectively retrieved by the event data client application interface from the process database in response to a database query.

27. The computer-readable medium of claim 25 wherein the sequence of events server includes a configuration database and further comprising computer-executable instructions facilitating performing the step of:
   storing, within the configuration database, operating characteristics of the sequence of events server, wherein the configuration database includes a set of digital signals provided by the control module for which value changes are to be acquired by the event data interface.

28. The computer-readable medium of claim 25 further comprising computer-executable instructions facilitating performing the step of:
   applying a debounce filter to received timestamped event data.

29. The computer-readable medium of claim 25 further comprising computer-executable instructions facilitating applying a restart algorithm that determines whether a digital signal value changed during an off-line period by at least comparing a received value for the digital signal to a last stored value, if one exists, in the process database.

30. The computer-readable medium of claim 25 further comprising computer-executable instructions facilitating performing the step of:
   maintaining, by the even buffer, received event data until a need arises to free space to store more recently received event data.

* * * * *